(12) United States Patent
Yang (10) Patent No.: US 11,507,404 B2
(45) Date of Patent: Nov. 22, 2022

(54) VIRTUALIZED REMOTE DIRECT MEMORY ACCESS

(71) Applicant: Intel Corporation, Santa Clara, CA (US)

(72) Inventor: Ziye Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 16/464,625

(22) PCT Filed: Dec. 28, 2016

(86) PCT No.: PCT/CN2016/112703
§ 371 (c)(1),
(2) Date: May 28, 2019

(87) PCT Pub. No.: WO2018/119774
PCT Pub. Date: Jul. 5, 2018

(65) Prior Publication Data
US 2020/0326971 A1 Oct. 15, 2020

(51) Int. Cl.
*G06F 9/455* (2018.01)
*G06F 9/54* (2006.01)
(Continued)

(52) U.S. Cl.
CPC .......... *G06F 9/45558* (2013.01); *G06F 9/546* (2013.01); *G06F 15/17331* (2013.01);
(Continued)

(58) Field of Classification Search
None
See application file for complete search history.

(56) References Cited

U.S. PATENT DOCUMENTS

| 7,987,469 B2 * | 7/2011 | Magro | G06F 9/45533 |
| | | | 719/314 |
| 8,225,330 B2 * | 7/2012 | Magro | G06F 9/45558 |
| | | | 719/314 |

(Continued)

FOREIGN PATENT DOCUMENTS

WO 2018119774 A1 7/2018

OTHER PUBLICATIONS

PCT International Search Report and Written Opinion issued in PCT/CN2016/112703 dated Jun. 29, 2017; 11 pages.

*Primary Examiner* — Van H Nguyen
(74) *Attorney, Agent, or Firm* — Compass IP Law PC (57) ABSTRACT

Particular embodiments described herein provide for an electronic device that can be configured to receive a remote direct memory access (RDMA) message from a first virtual machine located on a first network element, determine that the RDMA message is destined for a second virtual machine that is located on the first network element, and use a local direct memory access engine to process the RDMA message, where the local direct memory access engine is located on the first network element. In an example, the electronic device can be further configured to determine that the RDMA message is destined for a third virtual machine on a second network element, wherein the second network element is different than the first network element and use an other device acceleration driver to process the RDMA message instead of the local direct memory access engine.

16 Claims, 7 Drawing Sheets

(51) Int. Cl.
*G06F 15/173* (2006.01)
*H04L 12/46* (2006.01)
*H04L 69/16* (2022.01)
*H04L 69/163* (2022.01)

(52) U.S. Cl.
CPC ........ *H04L 12/4633* (2013.01); *H04L 69/161* (2013.01); *H04L 69/163* (2013.01); *G06F 2009/45583* (2013.01); *G06F 2009/45595* (2013.01)

(56) References Cited

U.S. PATENT DOCUMENTS

| | | | | |
|---|---|---|---|---|
| 8,374,175 | B2 * | 2/2013 | Riley | H04L 45/22 370/386 |
| 8,490,113 | B2 * | 7/2013 | Aho | G06F 15/167 719/313 |
| 9,411,775 | B2 * | 8/2016 | Sharp | G06F 15/167 |
| 9,665,534 | B2 * | 5/2017 | Tsirkin | G06F 13/28 |
| 10,157,146 | B2 * | 12/2018 | Tsirkin | G06F 12/109 |
| 10,375,167 | B2 * | 8/2019 | Shamis | G06F 15/17331 |
| 10,452,580 | B2 * | 10/2019 | Davda | G06F 13/28 |
| 2012/0159486 | A1 | 6/2012 | Ben-Yehuda et al. | |
| 2015/0089010 | A1 | 3/2015 | Tsirkin et al. | |
| 2016/0267053 | A1 | 9/2016 | Sharp et al. | |
| 2017/0149890 | A1 * | 5/2017 | Shamis | G06F 15/17331 |

\* cited by examiner

VIRTUALIZED REMOTE DIRECT MEMORY ACCESS

CROSS-REFERENCE TO RELATED APPLICATION

This application is a national stage application under 35 U.S.C. § 371 of PCT International Application Serial No. PCT/CN2016/112703, filed on Dec. 28, 2016 and entitled "VIRTUALIZED REMOTE DIRECT MEMORY ACCESS," which is hereby incorporated by reference herein in its entirety.

TECHNICAL FIELD

This disclosure relates in general to the field of computing, and more particularly, to virtualized remote direct memory access.

BACKGROUND

Remote direct memory access (RDMA) allows computers in a network to exchange data in main memory without involving the processor, cache, or operating system of either computer. Like locally-based direct memory access (DMA), RDMA improves throughput and performance because it frees up resources. RDMA also facilitates a faster data transfer rate. More specifically, RDMA implements a transport protocol in the network interface card (NIC) hardware and supports a feature called zero-copy networking. Zero-copy networking makes it possible to read data directly from the main memory of one computer and write that data directly to the main memory of another computer.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Emobdiments

The following detailed description sets forth example embodiments of apparatuses, methods, and systems relating to a communication system for enabling virtualized remote direct memory access. Features such as structure(s), function (s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

For purposes of illustrating certain example techniques of communication system 100, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One trend is RDMA. RDMA is a direct memory access from the memory of one computer, machine, or device (a host device) into that of another computer, machine, or device (a guest device) without involving either one's operating system. This allows computers in a network to exchange data in main memory without involving the processor, cache, or operating system of either computer. RDMA can permit high-throughput and low-latency networking that improves throughput and performance because it frees up resources and can also facilitate a faster data transfer rate. RDMA supports zero-copy networking by enabling a network adapter to transfer data directly to (or from) application memory and eliminate the need to copy data between application memory and the data buffers in the operating system. Such transfers can require no or very little work to be done by CPUs, caches, or context switches, and transfers can continue in parallel with other system operations.

When legacy applications with RDMA requirements (e.g., via open fabric enterprise distribution (OFED) application program interfaces (APIs)) are migrated to virtualized network environments, the expectation or desire is that those applications should still run with the high performance of RDMA. Currently, one solution is hardware assisted virtualization where the hypervisor utilizes a single root input/output virtualization (SR-IOV) to virtualize the real RDMA devices and assign it to the corresponding VMs which run those applications. The SR-IOV can virtualize a physical RDMA device and share the virtual function (VF) of the RDMA device with the VMs. A second current solution is a para-virtualization method in the hypervisor where the hypervisor exposes the para interface to the guest operating system (OS) and emulates the para RDMA device and re-directs data to a hypervisor's RDMA stack. However, these solutions rely on a real homogeneous RDMA device and cannot support legacy applications with RDMA requirements in VMs and still achieve relatively high performance without a homogeneous RDMA device.

Figure 1:
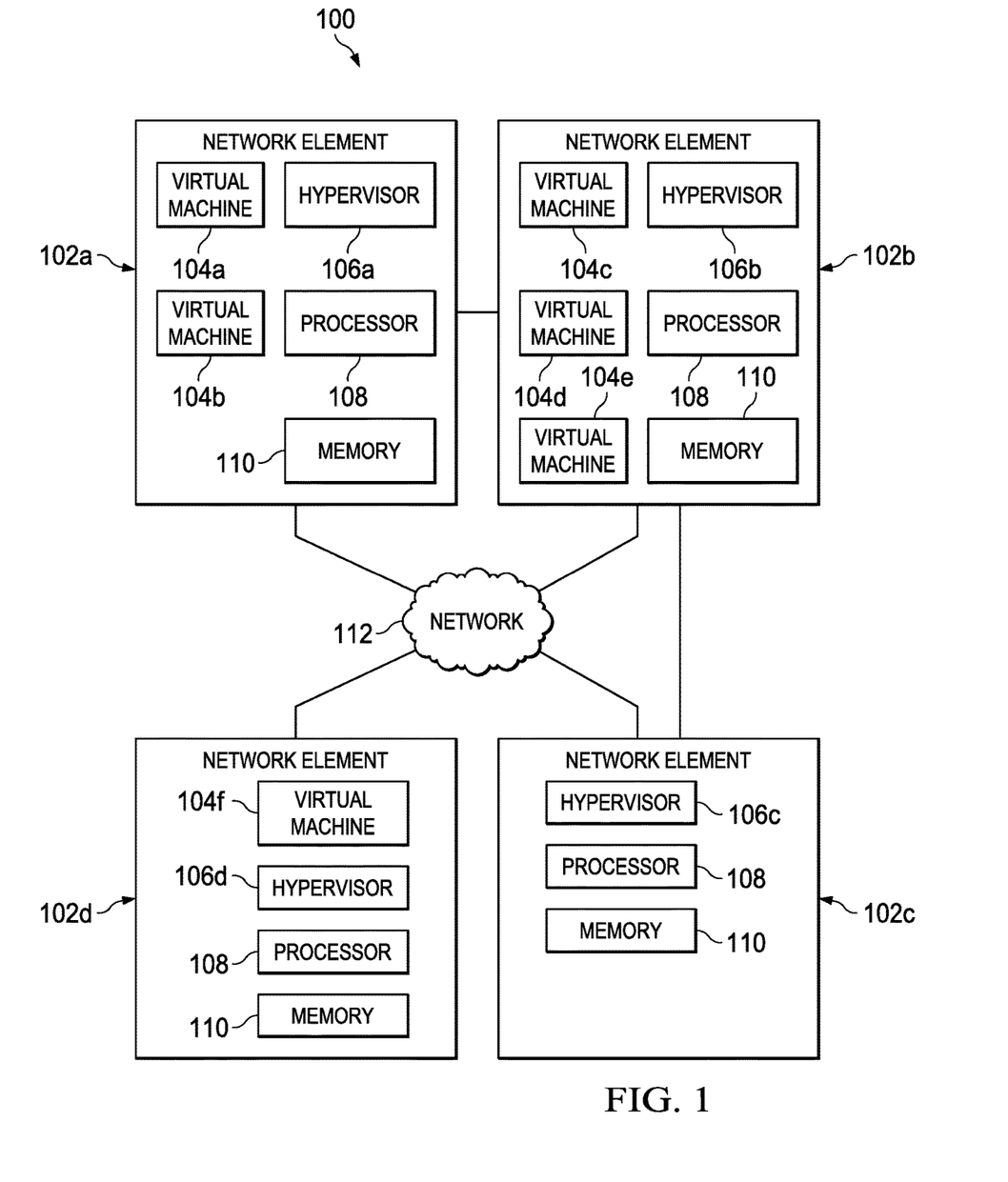
FIG. 1 is a simplified block diagram of a communication system to enable virtualized remote direct memory access in accordance with an embodiment of the present disclosure.

A communication system that can enable virtualized RDMA, as outlined in FIG. 1, can resolve these issues (and others). FIG. 1 is a simplified block diagram of a communication system 100 to illustrate an example use of virtualized remote direct memory access (RDMA). Communication system 100 can include a plurality of network elements 102a-102d. Each network element can communicate with other network elements using network 112. For example, network element 102a can communicate with network element 102d using network 112. In some examples, a network element can communicate with another network element directly. For example, network element 102b may be in direct communication with network element 102c.

Network element 102a can include virtual machines (VM) 104a and 104b, a hypervisor 106a, a processor 108, and memory 110. Network element 102b can include VMs 104c, 104d, and 104e, a hypervisor 106b, processor 108, and memory 110. Network element 102c can include a hypervisor 106c, processor 108, and memory 110. Network element 102d can include VM 104f, a hypervisor 106d, processor 108, and memory 110. Note that each network element 102a-102d can include one or more VMs or may not include any VMs. Each network element 102a-102d may be a host. Also, each network element 102a-102d and each VM 104a-104f may be a host device or a guest device for RDMA operations.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Communication system 100 can be configured to support applications with RDMA requirements in a virtualization environment with non-homogenous devices. For example, communication system 100 can be configured to simulate/emulate a RDMA device and allow for virtual RDMA communications between a host device (e.g., network element 102a or VM 104a) and a guest device (e.g., network element 102b or VM 104b). The term "host" includes a network element or device that includes a host device and/or a guest device. The term "host device" includes a network element, VM, or some other device that initiates the RDMA operations. The term "guest device" includes a network element, VM, or some other device that engages in the RDMA operations with the host device. In some examples, a host can include both the host device and the guest device. In other examples, a first host can include the host device and a second host can include the guest device.

In a specific example, communication system 100 can be configured to provide a system, method, and apparatus for virtualizing RDMA devices without requiring each device to be a homogenous physical RDMA device. In a hypervisor layer or network functions virtualization (NFV) layer, various means can be used to accelerate the performance of the system without a requirement for homogenous virtualization. For example, if two VMs are in the same host (e.g., VM 104a and VM 104b located in network element 102a), the system can use a DMA copy mechanism or memory sharing between the two VMs and a local DMA engine (e.g., local DMA engine 136 illustrated in FIG. 2) may be leveraged. If two VMs are not on the same host (e.g., VM 104a is located in network element 102a and VM 104c is located in network element 102b), and if there is an available field programmable gate array (FPGA) (e.g., FPGA 148a and FPGA 114b illustrated in FIG. 4), the applications in the guest device (e.g., network element 102b) can call the FPGA for acceleration. If two VMs are not on the same host and there is no acceleration device (e.g., no FPGA) and there are VM communications through a virtualized network interface controller (NIC) (e.g., virtualized NIC 150 illustrated in FIG. 2) with RDMA capability (RNIC), the system can use software emulation.

In a VM, a virtualized RDMA device (e.g., virtual RDMA engine 114 illustrated in FIG. 2) can be provided. The VM can include a guest OS (e.g., OS 118a) and in the guest OS the applications with RDMA requirements can use available transparent open fabrics enterprise distribution (OFED) related APIs (e.g., libibverbs 114). This means that there is no usage change for the applications. In a kernel space (e.g., kernel 112), there can be an RDMA driver (e.g., RDMA driver 120). In a specific implementation, if the hypervisor delivers with para-virtualization, then the RDMA driver should be a para-virtualized RDMA driver. The term para-virtualization includes an enhancement of virtualization technology in which a guest OS is recompiled prior to installation inside the virtual machine. Para-virtualization can allow for an interface to a virtual machine that can differ somewhat from that of the underlying hardware. The term para-virtualized RDMA driver includes a driver in a guest OS that collaborates with the hypervisor/VM with hypercall to provide the RDMA features to applications in a guest OS.

In a specific example, for virtualized RDMA, a physical device, such as a local DMA engine (e.g., local DMA engine 136 illustrated in FIG. 2) or an FPGA (e.g., FPGA 148a illustrated in FIG. 4) can be configured to access all the memory regions registered by the virtualized RDMA device in the VM. For RDMA queue related managements, the virtualized queues (e.g., send queues, receive queues, completion queues, etc.) of the VMs can be mapped to corresponding queues maintained by the hypervisor or network functions virtualization (NFV) layer layer.

In an example implementation, the RDMA device emulation layer in the hypervisor or the NFV can call corresponding primitives (e.g., RDMA operations such as read, write, send, etc.) in different acceleration engines (e.g., acceleration engine 134). In work request (WR) operations (e.g., read/write, send/receive, etc.), the key operations that influence the performance of the system are RDMA read and write. Those operations can be offloaded by an accelerate engine (e.g., other device acceleration engine 116 shown in FIG. 2). An RDMA read/write operation can include a remote RDMA information that points to the key and address exported by the remote RDMA side (<key, address> field of RDMA related packets). The key can be a key registered by the remote RDMA application and the address can be a virtual address of the remote application. The RDMA read/write operation can also include local memory information (<address, length> field of RDMA related packets) that points to the exported local memory address and length. The address in the local memory address can be the virtual address of the application in the same host and the length can be the length to send or receive data. For offloading, the address needs to be passed into other device acceleration driver 138 (or FPGA 148 (illustrated in FIG. 4)), local DMA engine 136, etc.

When the host device (e.g., VM 104*a*) and guest device (e.g., VM 104*b*) are in the same host (e.g., network element 102*a*), an acceleration engine (e.g., acceleration engine 134) can copy from address A to address B in the same operation or function similar to a local DMA copy engine. As a result, for the RDMA read/write, a hypervisor (e.g., hypervisor 106*a*, 106*b*, etc.), an FPGA (e.g., FPGA 148 illustrated in FIG. 4) or some other device can obtain the physical address from the remote information <key, address> field in address lookup table 154 (illustrated in FIG. 2). The physical address can be obtained from local information (e.g., <address, length> field) in address lookup table 154. Data from a host device to a guest device can be copied for an RDMA read operation and data from the guest device to the host device can be copied for an RDMA write operation. In addition, a completion queue element (CQE) (e.g., CQE 160) can be injected into the virtual completion queue of the RDMA device when the RDMA read/writes are completed. The CQE is an element that indicates when the RDMA read/writes are completed or sent and the send and receive queues (e.g., send queue 142*a* and receive queue 144*a*) are empty or have sent and received the RDMA data.

When the host device (e.g., VM 104*a*) and guest device (e.g., VM 104*c*) are not in the same host (e.g., VM 104*a* is on network element 102*a* and VM 104*c* is on network element 102*b*), the acceleration engine can choose to use other acceleration engines or an acceleration engine other than the local DMA copy engine. If the host device (e.g., VM 104*a*) is connected to other devices by another host controller adapter (HCA) (e.g., HCA 156*a* or 156*b* illustrated in FIG. 4), the virtual queues from the guest device can be mapped to the host device with some translation and the HCA can be allowed to handle the RDMA read/writes. When the RDMA read/writes are completed, the hypervisor can perform some translations to the completion requests and inject a CQE into the virtual completion queue of the RDMA device.

Figure 4:
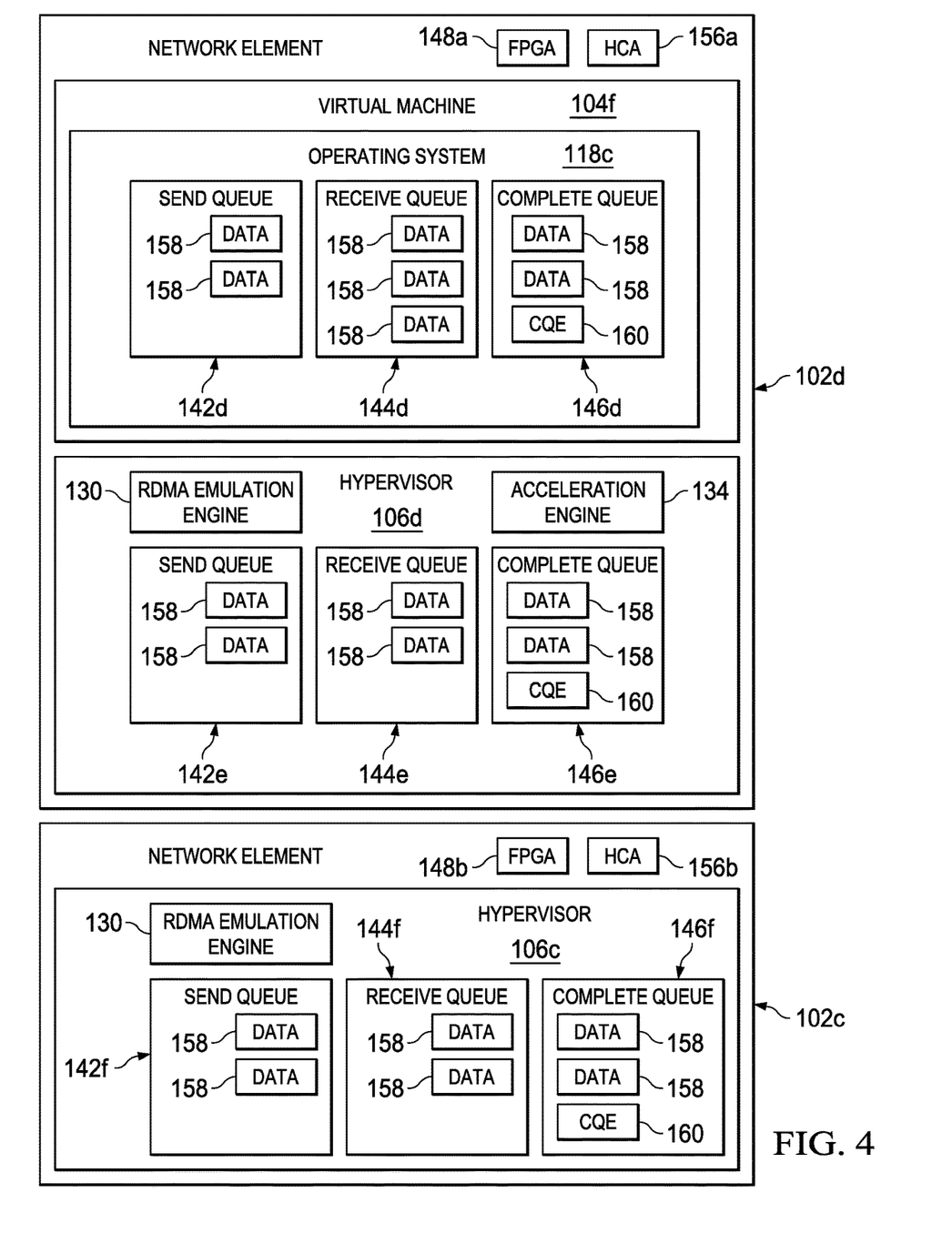
FIG. 4 is a simplified block diagram illustrating example details associated with a communication system to enable virtualized remote direct memory access in accordance with an embodiment of the present disclosure.

If only an FPGA is available, then the RDMA read process will be slightly different and needs the assistance of the network element associated with the guest device, if the network element associated with the guest device is also using the same hypervisor. In this example, for a RDMA write, the hypervisor network element associated with the host device converts the RDMA write to TCP/IP requests and leverages the FPGA to copy the data pointed to by the <address, length> field. The <address, length> field may be part of RDMA related packets (e.g., libibverbs structure packed) and the address portion can be obtained from lookup table 154. The data pointed by the <address, length> field can be obtained by the FPGA. The FPGA can be configured to encapsulate the data, the <key, address> field, and the destination information into network packets. When the hypervisor in the network element associated with the guest device receives such packets, the hypervisor can identify the packet as a special packet and use the FPGA to de-capsulate the data and extract the <key, address> field, identify the guest device that is the target and append copy the data to the address pointed to by the address in <key, address> field. The <key, address> field may be part of RDMA related packets (e.g., libibverbs structure packed) and the address portion can be obtained from lookup table 154. The FPGA can send a response to the hypervisor associated with the host device (e.g., the host hypervisor). When the host hypervisor receives the response, the host hypervisor can inject the CQE into the virtual completion queue of the host device.

For an RDMA read, a hypervisor associated with the guest device (e.g., a hypervisor in the host or device that includes the guest device) can convert the RDMA read to TCP/IP requests. The guest FPGA (e.g., an FPGA associated with the guest device) can be configured to encapsulate the data request from the host device with the <key, address> field included in the network packets and the destination information gained by the host associated with the guest device. When the guest hypervisor (e.g., a hypervisor associated with the guest device) receives such packets, the guest hypervisor can identify the packets as a special TCP/IP requests. The guest FPGA can be used to de-capsulate the data and extract the <key, address> field, identify the guest device, and continue to use the guest FPGA to copy the data from the address in the <key, address> field. The guest FPGA can encapsulate a response data packet and sent the response to the host hypervisor (e.g., the hypervisor associated with the host device). When the host hypervisor receives the response, the host hypervisor can leverage the host FPGA (e.g., the FPGA associated with the host device) to de-capsulate the network packets, copy the data to the address in the <address, length> field for the corresponding guest device, and inject the CQE to the virtual completion queue of the host device.

Turning to the infrastructure of FIG. 1, communication system 100 in accordance with an example embodiment is shown. Generally, communication system 100 can be implemented in any type or topology of networks. Network 112 represent a series of points or nodes of interconnected communication paths for receiving and transmitting packets of information that propagate through communication system 100. Network 112 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). messages through the network could be made in accordance with various network protocols, (e.g., Ethernet, Infiniband, Omni-Path, etc.). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source and a destination on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In regards to the internal structure associated with communication system 100, each network element 102a-102d can include memory elements for storing information to be used in the operations outlined herein. Each network element 102a-102d may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

Additionally, each network element 102a-102d may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Network elements 102a-102d can be network elements and include, for example, physical or virtual servers or other similar devices that may be used in a network or cloud services architecture. Cloud services may generally be defined as the use of computing resources that are delivered as a service over a network, such as the Internet. The services may be distributed and separated to provide required support for network elements. Typically, compute, storage, and network resources are offered in a cloud infrastructure, effectively shifting the workload from a local network to the cloud network. A server can be a network element such as a server or virtual server and can be associated with clients, customers, endpoints, or end users wishing to initiate a communication in communication system 100 via some network. The term 'server' is inclusive of devices used to serve the requests of clients and/or perform some computational task on behalf of clients within communication systems 100.

Figure 2:
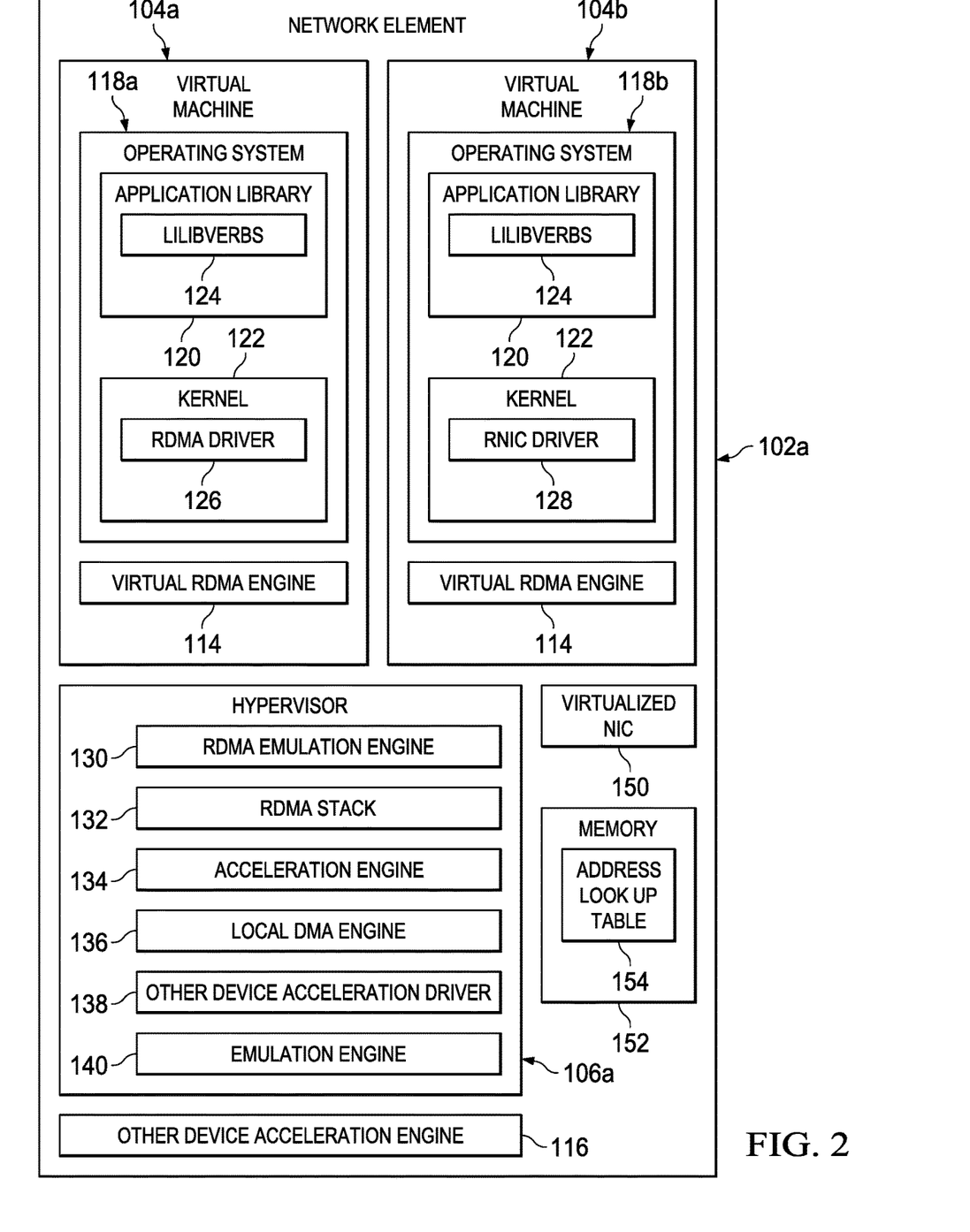
FIG. 2 is a simplified block diagram illustrating example details associated with a communication system to enable virtualized remote direct memory access in accordance with an embodiment of the present disclosure.

Turning to FIG. 2, FIG. 2 is a simplified block diagram of a portion of communication system 100 to illustrate an example use of virtualized RDMA. Network element 102a (a host device) can include virtual machines 104a and 104b, hypervisor 106a, an other device acceleration engine 116, a virtualized NIC 150, and memory 152. Memory 152 can include an address lookup table 154. Each VM (e.g. VM 104a and 104b) may have access to address lookup table 154 or each VM may have an associated lookup table 154. Other device acceleration engine 116 may be or have access to a field programmable gate array (FPGA) or some other engine or element that can help facilitate a virtualized RDMA environment. NIC 150 is an RNIC with RDMA capability.

VM 104a can include a virtual RDMA engine 114 and an operating system 118a. Operating system 118a can include an application library 120 and a kernel 122. Application library 120 can include libibverbs 124. Kernel 122 can include RDMA driver 126. VM 104b can include virtual RDMA engine 114 and an operating system 118b. Operating system 118b can include an application library 120 and a kernel 122. Application library 120 can include libibverbs 124. Kernel 122 can include RDMA driver 126. Applications with RDMA requirements can use the transparent open fabrics enterprise distribution (OFED) related APIs (e.g., libibverbs 124) in operating system 118a and 118b.

Hypervisor 106a can include a RDMA emulation engine 130, a RDMA stack 132, an acceleration engine 134, a local DMA engine 136, an other device acceleration driver 138, and an emulation engine 140. Emulation engine 140 can be configured as an RDMA software emulation engine. Network elements 102b-102d can include similar elements as those illustrated in FIG. 2, some of the elements illustrated in FIG. 2, a different number or instance of each element illustrated in FIG. 2, or other variations. Local DMA engine 136 can be configured to a DMA copy mechanism or memory sharing between the two VMs on the same host. Because the VMs are on the same host, the memory for the VMs can be relatively easily shared for the RDMA operations.

In the hypervisor or NFV layer, RDMA emulation engine 130 can be configured to intercept all the RDMA device emulation related control operations for VM 104a and VM 104b in network element 102b. VM 104a and VM 104b can each be configured for virtualized RDMA. RDMA stack 132 can be configured to implement RDMA operation related stacks. Acceleration engine 134 can be configured to handle the RDMA operations in different manners depending on if the host device and the guest device are on the same host or if the host device and the guest device are on different hosts. If the host device (e.g., VM 104a) and the guest device (e.g., VM 104b) are on the same host (e.g., network element 102a), acceleration engine 134 can use RDMA emulation engine 130 and local DMA engine 136 to facilitate the RDMA operations between the host device and the guest device. If the host device (e.g., VM 104a) and the guest device (e.g., VM 104c) are on different devices (e.g., VM 104a is on network element 102a and VM 104c is on network element 102b), acceleration engine 134 can use device acceleration driver 138 or FPGA 148a (illustrated in FIG. 4) to facilitate the RDMA operations between the host device and the guest device. If the host device (e.g., VM 104a) and the guest device (e.g., VM 104c) are on different devices and and there are VM communications through a virtualized network interface controller (NIC) (e.g., virtualized NIC 150), acceleration engine 134 can use emulation engine 140 to virtually simulate RDMA operations.

Using local DMA 136 engine or other device acceleration driver 138, the system can provide for relatively high performance virtualized RDMA devices or close to the performance of physical RDMA devices for the VMs. This can allow communication system 100 to be configured to virtualize a high performance RDMA device without requiring corresponding homogenous physical devices. The term "homogenous physical device" includes physical devices that are in the same category but may include some minor different features. For examples, RDMA NIC is a device category, and there are different RDMA NICs. Each one of the different RDMA NICs are homogeneous devices. The term "non-homogenous" devices includes heterogenous devices or devices that are not in the same category of devices.

RDMA emulation engine 130 can be configured to emulate RDMA behaviors of physical RDMA devices. Other device acceleration driver 138 can be configured to use physical acceleration methods by other physical devices (e.g., FPGA, etc.). Emulation engine 140 can be configured to virtually simulate the RDMA device behaviors through NIC 150. Libibverbs 124 includes a library that allows programs and processes to use RDMA protocol verbs for direct access to RDMA hardware.

In an example implementation, network elements 102a-102d are network elements, meant to encompass network appliances, servers (both virtual and physical), routers, switches, gateways, bridges, load balancers, processors, modules, or any other suitable virtual or physical device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as network elements 102a-102d may include software modules (e.g., RDMA emulation engine 130, RDMA stack 132, acceleration engine 134, local DMA engine 136, other device acceleration driver 138, and emulation engine 140) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Figure 3:
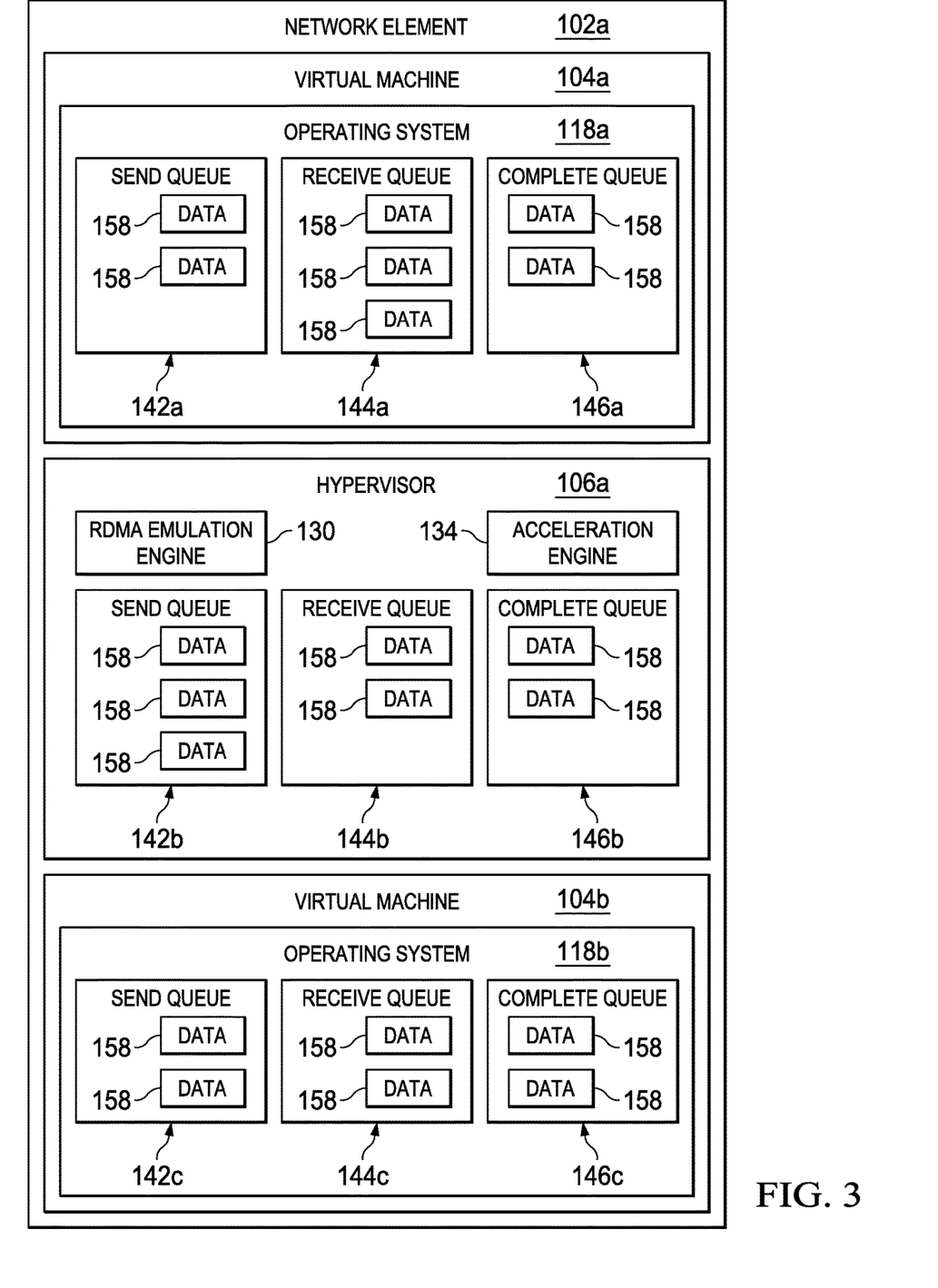
FIG. 3 is a simplified block diagram illustrating example details associated with a communication system to enable virtualized remote direct memory access in accordance with an embodiment of the present disclosure.

Turning to FIG. 3, FIG. 3 is an example block diagram illustrating example details associated with communication system 100, in accordance with an embodiment. In an example, network element 102a can include VM 104a and 104b. Because VM 104a and 104b are on the same host (e.g., network element 102a) RDMA emulation engine 130 in hypervisor 106 can be configured to facilitate RDMA operations between VM 104a and 104b.

More specifically, because VM 104a and VM 104b are on the same host or device, acceleration engine 134 can use RDMA emulation engine 130 and local DMA engine 136 for an RDMA read/write using send queue 142a and receive queue 144a in VM 104a, send queue 142b and receive queue 144b in hypervisor 106a, and send queue 142c and receive queue 144c in VM 104b. A physical address for send queue 142a and receive queue 144a can be obtained from the <key, virtual address> field. The physical address for send queue 142c and receive queue 144c can be obtained from the <address, length> field. Data 158 from send queue 142a to receive queue 144c can be copied for RDMA read in send queue 142b and data 158 from send queue 142c to receive queue 144a can be copied for RDMA write in send queue 142b. In addition, a CQE 160 can be injected into completion queue 146a, 146b, and 146c when the RDMA read/ writes are complete.

Turning to FIG. 4, FIG. 4 is an example block diagram illustrating example details associated with communication system 100, in accordance with an embodiment. In an example, network element 102d can include VM 104f hypervisor 106d, other device acceleration engine 116, FPGA 148a, and HCA 156a. Network element 102c can include hypervisor 106c, other device acceleration engine 116, FPGA 148b, and HCA 156b. In this example, VM 104f is the host device and network element 102c is the guest device. Because VM 104f is not a part of network element 102c (or is a VM included in network element 102c) RDMA emulation engine 130 cannot be used to facilitate RDMA operations.

When the host device (e.g., VM 104f) and the guest device (e.g., network element 102c) are not in the same device (e.g., VM 104f and network element 102c are not on the same device or part of the same device), acceleration engine 134 can use other device acceleration engine 116 or an acceleration engine other than the local DMA copy engine. If VM 104f is connected to network element 102c by another HCA 156a, the virtual queues from VM 104f can be mapped to network element 102c with some translation, and HCA 156b in network element 102c (the guest device) can be allowed to handle the RDMA read/writes. When the RDMA read/ writes are completed, hypervisor 106d can perform some translations to the completion requests and inject CQE 160 into complete queue 146d of VM 104f.

If an FPGA is available (e.g., FGPA 148*a*), then the RDMA read process will be slightly different then as described with respect to FIG. 3 where the VMs are on the same host. The RDMA process will require the assistance of the network element 102*c* which acts as the remote host. For a RDMA write, hypervisor 106*d* can be configured to convert data 158 in send queue 142*d* to TCP/IP requests and leverage FPGA 148*a* to copy the data pointed to by the <address, length> field. In an example, the data pointed to by the <address, length> field can be found by using an address translation table and hypervisor 106*d* can obtain the data and encapsulate the data plus <key, address> field and the destination information into network packets. When hypervisor 106*c* receives the encapsulated packets, it can identify the encapsulated packets as a special packet and use FPGA 148*b* to de-capsulate the data and extract the <key, address> field. Hypervisor 106*c* can also identify the destination of the data (e.g., network element 102*c* or a VM) and append copy the data to the address pointed to by the address in the <key, address> field. FPGA 148*b* can send a response to hypervisor 106*d* (the initiator hypervisor). When hypervisor 106*d* receives the response, hypervisor 106*d* can inject CQE 160 into completion queue 146*d*.

For an RDMA read, hypervisor 106*d* can convert the RDMA read data 158 to TCP/IP requests. FPGA 148*a* can encapsulate the data request with the <key, address> field and the destination information. When hypervisor 106*c* receives such packets, it can identify the packets as a special TCP/IP requests, use FPGA 148*b* to de-capsulate the data and extract the <key, address> field, identify the host device and continue to use FPGA 148*b* to copy the data from the address in <key, address> field. Finally, FPGA 148*b* can encapsulate a response data packet and sent it to hypervisor 106*d*. When the hypervisor 106*d* receives the response, hypervisor 106*d* can leverage FPGA 148*a* to de-capsulate the network packets, copy the data to the address in <address, length> field for VM 104*f*, and inject CQE 160 to completion queue 146*d* and 146*e*.

Figure 5:
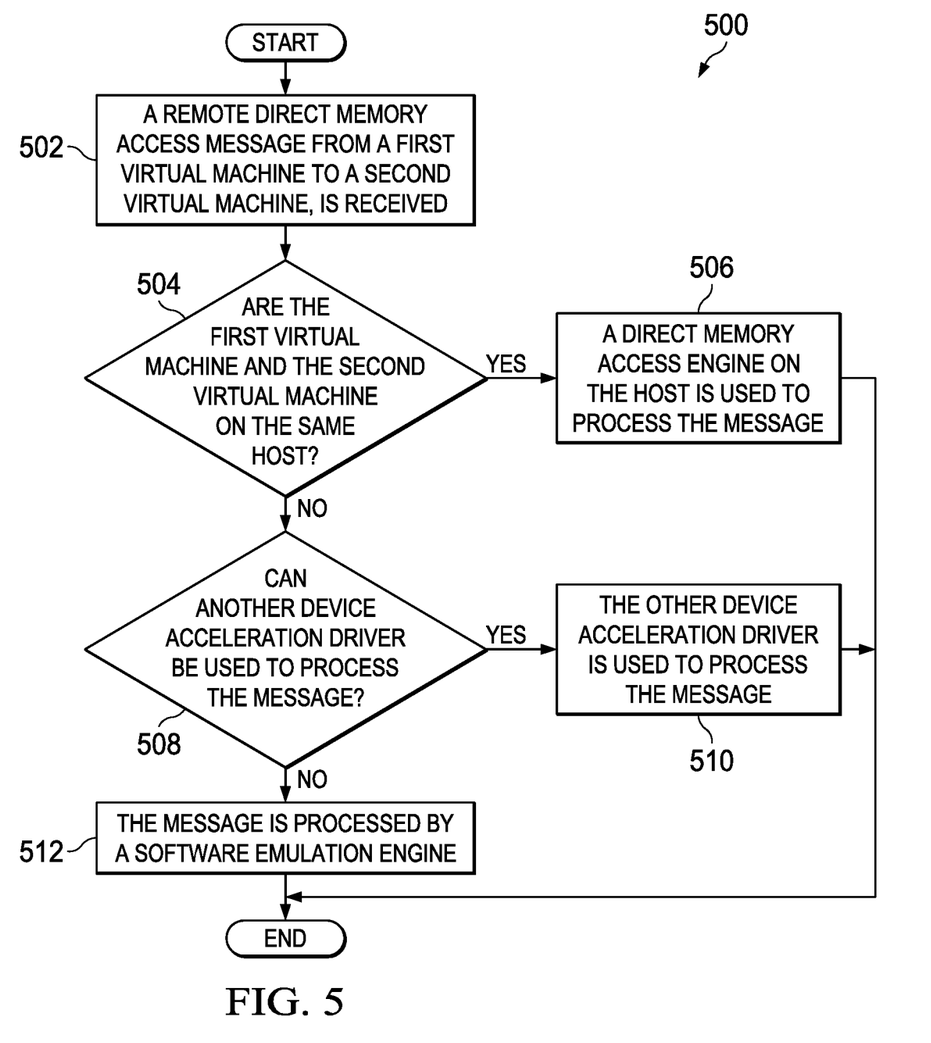
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with virtualized RDMA, in accordance with an embodiment. In an embodiment, one or more operations of flow 500 may be performed by RDMA emulation engine 130, RDMA stack 132, acceleration engine 134, local DMA engine 136, other device acceleration driver 138, and emulation engine 140. At 502, a RDMA message from a first VM, to a second VM, is received. At 504, the system determines if the first VM and the second VM are on the same host. If the first VM and the second VM are on the same host, then a direct memory access engine on the host is used to process the RDMA message, as in 506. For example, VM 104*a* and 104*b* are on the same network element 102*a* and local DMA engine 136 can be used to process RDMA messages between VM 104*a* and 104*b*.

If the first VM and the second VM are not on the same host, then the system determines if an other device acceleration driver can be used to process the message, as in 508. If an other device acceleration driver can be used to process the message, then the other device acceleration driver issued to process the message, as in 510. For example, other device acceleration driver 138 may be used to process the RDMA message. In an example, the other device acceleration driver may be a FPGA (e.g., FPGA 148*a*) or an HCA (e.g., HCA 156*a*). If an other device acceleration driver cannot be used to process the message, then the message is process by a emulation engine, as in 512. For example, the message may be processed by emulation engine 140.

Figure 6:
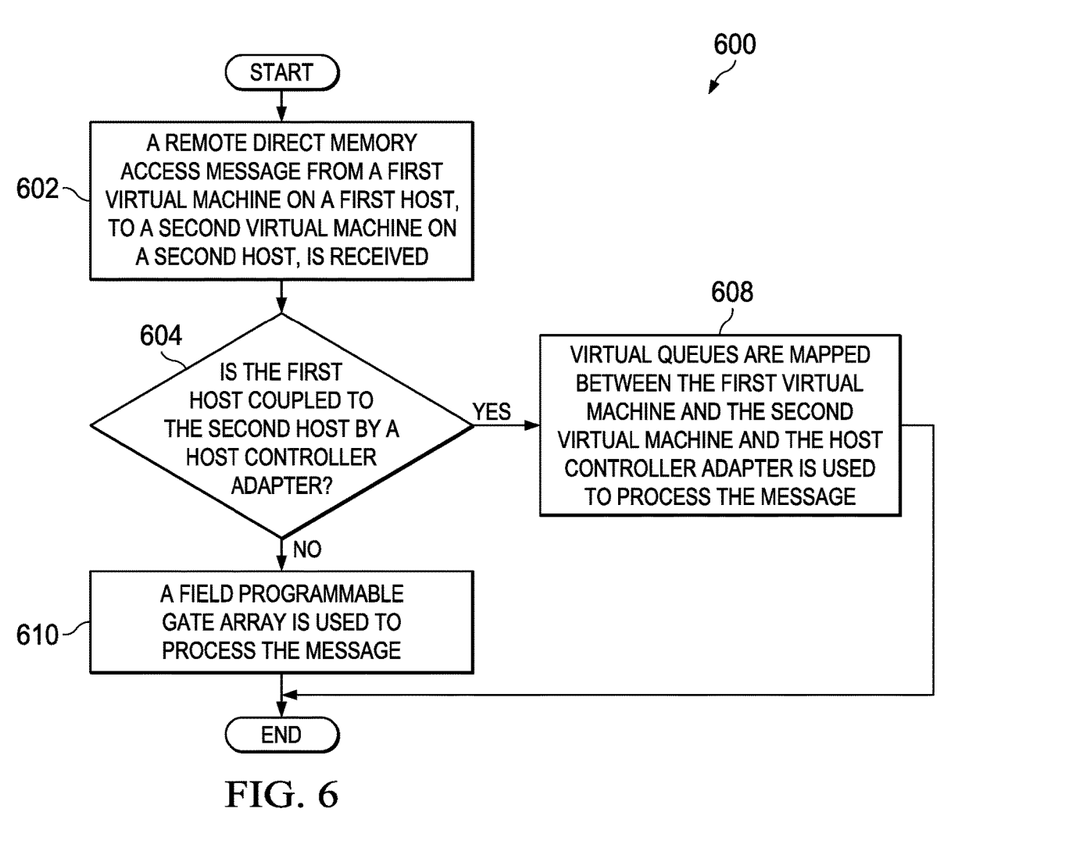
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with virtualized RDMA, in accordance with an embodiment. In an embodiment, one or more operations of flow 600 may be performed by RDMA emulation engine 130, RDMA stack 132, acceleration engine 134, local DMA engine 136, other device acceleration driver 138, and emulation engine 140. At 602, an RDMA message from a first VM on a first host, to a second VM on a second host, is received. At 604, the system determines if the first host is coupled to the second host by a host controller adapter. If the first host is coupled to the second host by a host controller adapter, then virtual queues are mapped between the first VM and the second VM and the host controller adapter is used to process the message, as in 608. For example, if a first host (e.g., network element 102*a* or VM 104*a*) is coupled to a second host (e.g., network element 102*d* or VM 104*f*) by a host controller adapter (e.g., HCA 156*a* and 156*b*), then send queues 142*a* and 142*d*, receive queues 144*a* and 144*d*, and complete queues 146*a* and 146*d* can be mapped between VM 104*a* and VM 104*f* and a hypervisor (e.g., hypervisor 106*a* or 106*d*) can implement the queues in a shared memory model and VM 104*a* and 104*d* can share the access privilege to the queues (e.g., send queues 142*a* and 142*d*, receive queues 144*a* and 144*d*, and complete queues 146*a* and 146*d*) in the shared memory model. If the first host is not coupled to the second host by a host controller adapter, then a field programmable gate array is used to process the message, as in 610.

Figure 7:
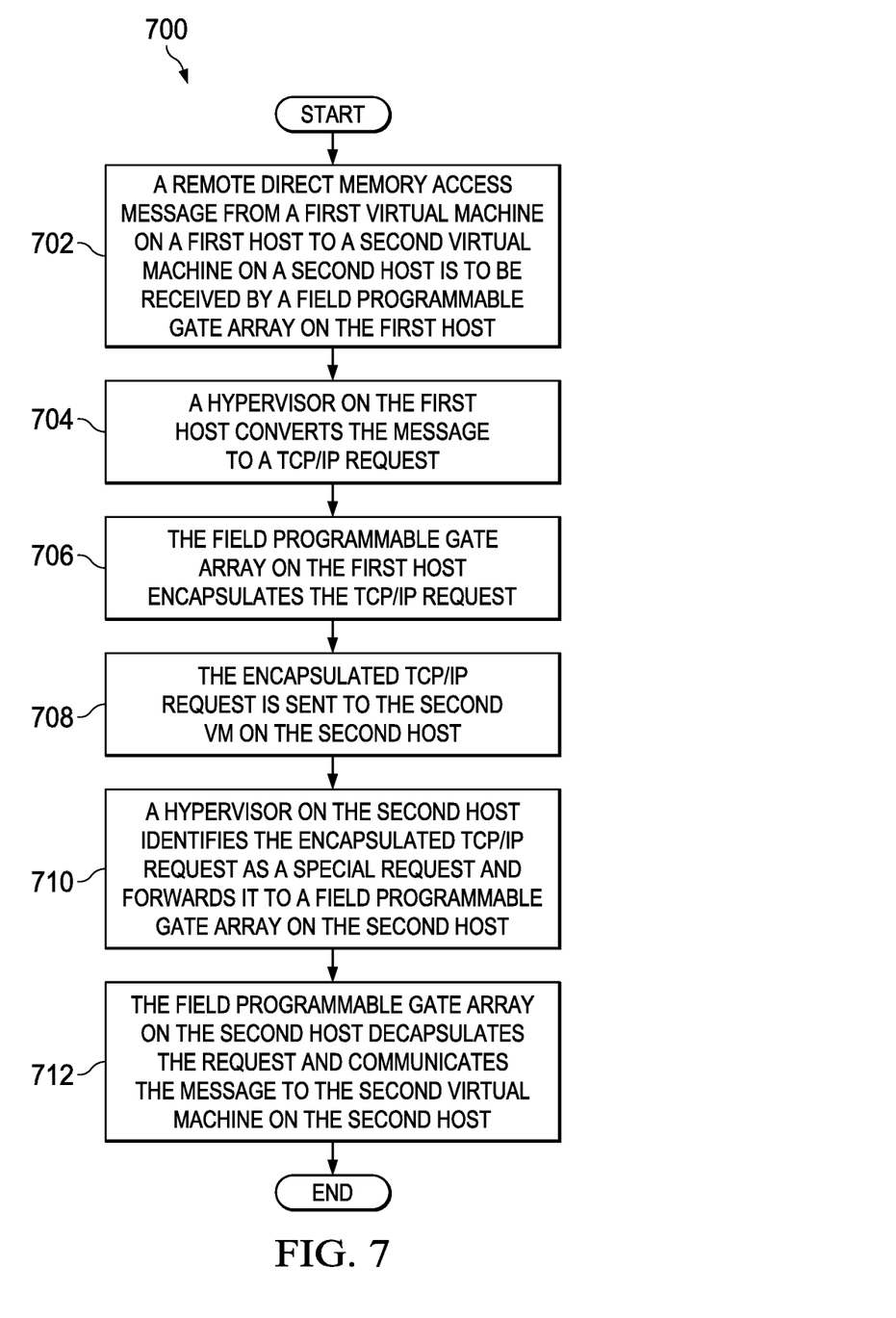
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with virtualized RDMA, in accordance with an embodiment. In an embodiment, one or more operations of flow 700 may be performed by RDMA emulation engine 130, RDMA stack 132, acceleration engine 134, local DMA engine 136, other device acceleration driver 138, and emulation engine 140. At 702, a RDMA message from a first VM on a first host to a second VM on a second host is to be received by a FPGA on the first host. At 704, a hypervisor on the first host converts the message to a TCP/IP request. At 706, the FPGA on the first host encapsulates the TCP/IP request. At 708, the encapsulated TCP/IP request is sent to the second VM on the second host. At 710, a hypervisor on the second host identifies the encapsulated TCP/IP request as a special request and forwards it to a FPGA on the second host. At 712, the FPGA on the second host decapsulates the request and communicates the message of the second VM on the second host.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to receive a remote direct memory access (RDMA) message from a first virtual machine located on a first network element, determine that the RDMA message is destined for a second virtual machine that is located on the first network element, and use a local direct memory access engine to process the RDMA message, wherein the local direct memory access engine is located on the first network element.

In Example C2, the subject matter of Example C1 can optionally include where the instructions, when executed by the by at least one processor, further cause the at least one processor to determine that the RDMA message is destined for a third virtual machine on a second network element, wherein the second network element is different than the first network element and use an other device acceleration driver to process the RDMA message instead of the local direct memory access engine.

In Example C3, the subject matter of any one of Examples C1-C2 can optionally include where the instructions, when executed by the by at least one processor, further cause the at least one processor to map virtual queues between the first virtual machine and the third virtual machine if the first network element is coupled to the second network element by a host controller adapter.

In Example C4, the subject matter of any one of Examples C1-C3 can optionally include where the other device acceleration driver is a field programmable gate array (FPGA).

In Example C5, the subject matter of any one of Examples C1-C4 can optionally include where the instructions, when executed by the by at least one processor, further cause the at least one processor to convert the RDMA message to a TCP/IP request.

In Example C6, the subject matter of any one of Examples C1-C5 can optionally include where the FPGA encapsulates the TCP/IP request.

In Example C7, the subject matter of any one of Examples C1-C6 can optionally include where a second hypervisor on the second network element identifies the encapsulated TCP/IP request and forwards the encapsulated RCP/IP request to a second FPGA on the second network element.

In Example C8, the subject matter of any one of Examples C1-C7 can optionally include where the first virtual machine and the second virtual machine are non-homogenous devices.

In Example C9, the subject matter of any one of Examples C1-C7 can optionally include where the first virtual machine, the second virtual machine, and the third virtual machine are non-homogenous devices.

Example S1 is a system for virtualized remote direct memory access, the system can include memory and at least one process to receive a remote direct memory access (RDMA) message from a first virtual machine on a first network element, determine that the RDMA message is destined for a second virtual machine that is located on the first network element, wherein the first virtual machine and the second virtual machine are non-homogenous devices, and use a local direct memory access engine to process the RDMA message, wherein the local direct memory access engine is located on the network element.

In Example S2, the subject matter of Example S1 can optionally include where the at least one processor is further configured to determine that the RDMA message is destined for a third virtual machine on a second network element, wherein the second network element is different than the first network element and use an other device acceleration driver to process the RDMA message instead of the local direct memory access engine.

In Example S3, the subject matter of any one of the Examples S1-S2 can optionally include where the at least one processor is further configured to map virtual queues between the first virtual machine and the third virtual machine if the first network element is coupled to the second network element by a host controller adapter.

In Example S4, the subject matter of any one of the Examples S1-S3 can optionally include where the other device acceleration driver is a field programmable gate array (FPGA).

In Example S5, the subject matter of any one of the Examples S1-S4 can optionally include where the at least one processor is further configured to convert the RDMA message to a TCP/IP request and encapsulate the TCP/IP request.

In Example S6, the subject matter of any one of the Examples S1-S5 can optionally include where a second hypervisor on the second network element identifies the encapsulated TCP/IP request and forwards the encapsulated RCP/IP request to a second FPGA on the second network element.

In Example A1, an apparatus can include at least one memory element, at least one processor coupled to the at least one memory element, one or more virtual RDMA engines that, when executed by the at least one processor, is configured to one or more virtual RDMA engines that, when executed by the at least one processor, are configured to receive a RDMA message from a first virtual machine on a first network element, determine that the RDMA message is destined for a second virtual machine on the first network element, wherein the first virtual machine and the second virtual machine are non-homogenous devices, and use a local direct memory access engine to process the RDMA message, wherein the local direct memory access engine is located on the network element.

In Example, A2, the subject matter of Example A1 can optionally a hypervisor, where a hypervisor is configured to determine that the RDMA message is destined for a third virtual machine that is not located on the same network element as the first virtual machine and use an other device acceleration driver to process the RDMA message instead of the local direct memory access engine.

In Example A3, the subject matter of any one of Examples A1-A2 can optionally include where the hypervisor is further configured to map virtual queues between the first virtual machine and the third virtual machine if the first network element is coupled to the second network element by a host controller adapter.

In Example A4, the subject matter of any one of Examples A1-A3 can optionally include where the other device acceleration driver is a field programmable gate array (FPGA).

In Example A5, the subject matter of any one of Examples A1-A4 can optionally include where the apparatus is further configured to convert the message to a TCP/IP request.

Example M1 is a method including receiving a remote direct memory access (RDMA) message from a first virtual machine on a first network element, determining that the RDMA message is destined for a second virtual machine that is located on the first network element, wherein the first virtual machine and the second virtual machine are non-homogenous devices, and using a local direct memory access engine to process the RDMA message, wherein the local direct memory access engine is located on the first network element.

In Example M2, the subject matter of Example M1 can optionally include determining that the RDMA message is destined for a third virtual machine on a second network element, wherein the second network element is different than the first network element and using an other device acceleration driver to process the RDMA message instead of the local direct memory access engine.

In Example M3, the subject matter of any one of the Examples M1-M2 can optionally include mapping virtual queues between the first virtual machine and the third virtual machine if the first network element is coupled to the second network element by a host controller adapter.

In Example M4, the subject matter of any one of the Examples M1-M3 can optionally include where the other device acceleration driver is a field programmable gate array (FPGA).

In Example M5, the subject matter of any one of the Examples M1-M4 can optionally include converting the message to a TCP/IP request.

Example AA1 is an apparatus include means for receiving a remote direct memory access (RDMA) message from a first virtual machine located on a first network element, means for determining that the RDMA message is destined for a second virtual machine that is located on the first network element, and means for using a local direct memory access engine to process the message, wherein the local direct memory access engine is located on the network element.

In Example AA2, the subject matter of Example AA1 can optionally include means for determining that the RDMA message is destined for a third virtual machine on a second network element, wherein the second network element is different than the first network element and use an other device acceleration driver to process the RDMA message instead of the local direct memory access engine.

In Example AA3, the subject matter of any one of Examples AA1-AA2 can optionally include means for mapping virtual queues between the first virtual machine and the third virtual machine if the first network element is coupled to the second network element by a host controller adapter.

In Example AA4, the subject matter of any one of Examples AA1-AA3 can optionally include where the other device acceleration driver is a field programmable gate array (FPGA).

In Example AA5, the subject matter of any one of Examples AA1-AA4 can optionally include means for converting the RDMA message to a TCP/IP request.

In Example AA6, the subject matter of any one of Examples AA1 AA5 can optionally include where the FPGA encapsulates the TCP/IP request.

In Example AA7, the subject matter of any one of Examples AA1-AA6 can optionally include where a second hypervisor on the second network element identifies the encapsulated TCP/IP request and forwards the encapsulated RCP/IP request to a second FPGA on the second network element.

In Example AA8, the subject matter of any one of Examples AA1-AA7 can optionally include where the first virtual machine and the second virtual machine are non-homogenous devices.

In Example AA9, the subject matter of any one of Examples AA1-AA7 can optionally include where the first virtual machine, the second virtual machine, and the third virtual machine are non-homogenous devices.

Example X1 is a machine-readable storage medium including machine-readable instructions to implement a method or realize an apparatus as in any one of the Examples A1-A5, or M1-M5. Example Y1 is an apparatus comprising means for performing of any of the Example methods M1-M5. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one machine non-transitory readable storage medium having instructions stored thereon, wherein the instructions, when executed by at least one processor cause the at least one processor to:
   receive a remote direct memory access (RDMA) message from a first virtual machine located on a first network element;
   determine whether the RDMA message is destined for a second virtual machine that is located on the first network element or is destined for a third virtual machine that is located on a second network element, the second network element different than the first network element; and
   use a local direct memory access engine to process the RDMA message if the RDMA message is destined for the second virtual machine, wherein the local direct memory access engine is located on the first network element or, if the RDMA message is destined for the third virtual machine, use virtual queues mapped between the first virtual machine and the third virtual machine if the first network element is communicatively coupled to the second network element by a host controller adapter.

2. The at least one machine readable storage medium of claim 1, wherein the instructions, when executed by the at least one processor further cause the at least one processor to:

determine that the RDMA message is destined for the third virtual machine on the second network element;
determine the first network element is communicatively coupled to the second network element by a host controller adaptor; and
use the host controller adaptor to process the RDMA message instead of the local direct memory access engine.

3. The at least one machine readable storage medium of claim 1, the instructions, when executed by the at least one processor further cause the at least one processor to:
determine that the RDMA message is destined for the third virtual machine on the second network element;
determine the first network element is not communicatively coupled to the second network element by a host controller adaptor; and
use a field programmable gate array (FPGA) to convert the RDMA message to a TCP/IP request to have the FPGA process the RDMA message instead of the local direct memory access engine.

4. The at least one machine readable storage medium of claim 3, wherein the FPGA encapsulates the TCP/IP request.

5. The at least one machine readable storage medium of claim 4, wherein a second hypervisor on the second network element identifies the encapsulated TCP/IP request and forwards the encapsulated TCP/IP request to a second FPGA on the second network element.

6. The at least one machine readable storage medium of claim 1, wherein the first virtual machine, the second virtual machine, and the third virtual machine are non-homogenous devices.

7. A system for virtualized remote direct memory access, the system comprising:
memory; and
at least one processor to:
receive a remote direct memory access (RDMA) message from a first virtual machine on a first network element;
determine whether the RDMA message is destined for a second virtual machine that is located on the first network element, wherein the first virtual machine and the second virtual machine are non-homogenous devices, or whether the RDMA message is destined for a third virtual machine that is located on a second network element, the second network element different than the first network element; and
use a local direct memory access engine to process the RDMA message if the RDMA message is destined for the second virtual machine, wherein the local direct memory access engine is located on the first network element or, if the RDMA message is destined for the third virtual machine, use virtual queues mapped between the first virtual machine and the third virtual machine if the first network element is communicatively coupled to the second network element by a host controller adapter.

8. The system of claim 7, wherein the processor is further configured to:
determine that the RDMA message is destined for the third virtual machine on the second network element;
determine the first network element is communicatively coupled to the second network element by a host controller adaptor; and
use the host controller adaptor to process the RDMA message instead of the local direct memory access engine.

9. The system of claim 7, wherein the processor is further configured to:
determine that the RDMA message is destined for the third virtual machine on the second network element;
determine the first network element is not communicatively coupled to the second network element by a host controller adaptor;
use a field programmable gate array (FPGA) to convert the RDMA message to a TCP/IP request to have the FPGA process the RDMA message instead of the local direct memory access engine.

10. The system of claim 9, wherein the processor is further configured to:
use the FPGA to encapsulate the TCP/IP request.

11. The system of claim 10, wherein a second hypervisor on the second network element identifies the encapsulated TCP/IP request and forwards the encapsulated TCP/IP request to a second FPGA on the second network element.

12. A method comprising:
receiving a remote direct memory access (RDMA) message from a first virtual machine on a first network element;
determining whether the RDMA message is destined for a second virtual machine that is located on the first network element, wherein the first virtual machine and the second virtual machine are non-homogenous devices, or whether the RDMA message is destined for a third virtual machine that is located on a second network element, the second network element different than the first network element; and
using a local direct memory access engine to process the RDMA message if the RDMA message is destined for the second virtual machine, wherein the local direct memory access engine is located on the first network element or, if the RDMA message is destined for the third virtual machine, using virtual queues mapped between the first virtual machine and the third virtual machine if the first network element is communicatively coupled to the second network element by a host controller adapter.

13. The method of claim 12, further comprising:
determining that the RDMA message is destined for the third virtual machine on the second network element;
determining that the first network element is communicatively coupled to the second network element by a host controller adaptor; and
using the host controller adaptor to process the RDMA message instead of the local direct memory access engine.

14. The method of claim 12, further comprising:
determining that the RDMA message is destined for the third virtual machine on the second network element:
determining the first network element is not communicatively coupled to the second network element by a host controller adaptor:
using a field programmable gate array (FPGA) to convert the RDMA message to a TCP/IP request to have the FPGA process the RDMA message instead of the local direct memory access engine.

15. The method of claim 14, further comprising:
encapsulating the TCP/IP request using the FPGA.

16. The method of claim 14, wherein the FPGA encapsulates the TCP/IP request.

* * * * *